(12) United States Patent
Pinkus et al.

(10) Patent No.: US 8,324,564 B1
(45) Date of Patent: Dec. 4, 2012

(54) QUAD EMISSIVE DISPLAY

(75) Inventors: Alan R. Pinkus, Bellbrook, OH (US);
Harry L. Task, Tucson, AZ (US);
Sheldon E. Unger, Englewood, OH (US)

(73) Assignee: The United States of America as represented, by the Secretary of the Air Force, Washington, DC (US)

( * ) Notice: Subject to any disclaimer, the term of this patent is extended or adjusted under 35 U.S.C. 154(b) by 518 days.

(21) Appl. No.: 12/720,920

(22) Filed: Mar. 10, 2010

Related U.S. Application Data (60) Provisional application No. 61/159,172, filed on Mar. 11, 2009.

(51) Int. Cl.
*G01D 18/00* (2006.01)
(52) U.S. Cl. .................................................. 250/252.1
(58) Field of Classification Search ............... 250/252.1, 250/340, 341.1–341.8, 342–353
See application file for complete search history.

(56) References Cited

U.S. PATENT DOCUMENTS

| | | |
|---|---|---|
| 5,070,239 A | 12/1991 | Pinkus |
| 5,567,937 A | 10/1996 | Pinkus |
| 5,608,213 A | 3/1997 | Pinkus et al. |
| 5,679,949 A | 10/1997 | Task et al. |
| 6,194,701 B1 | 2/2001 | Task et al. |
| 7,235,779 B1 | 6/2007 | Pinkus et al. |
| 2004/0042528 A1* | 3/2004 | Brinz et al. .................. 374/121 |

OTHER PUBLICATIONS

H.L. Task et al., "Theoretical and Applied Aspects of Night Vision Goggle Resolution and Visual Acuity Assessment", Helmet- and Helmet-Mounted Displays: Technologies & Applications, Proceedings of SPIE, 2007, vol. 6657, pp. 66570P-1.
A.R. Pinkus et al., "Reproducibility of Night Visioin Goggle Visual Acuity Measurements using Landolt C's", SAFE Symposium Proceedings 1999, 37th Annual Symposium.
A.R. Pinkus et al, "Measuring Observers' Visual Acuity through Night Vision Goggles", SAFE Symposium proceedings 1998, 36th Annual Symposium, pp. 1-11.
A.R. Pinkus et al., "The Effects of Aircraft Transparencies on Night Vision Goggle-Mediated Visual Acuity", SAFE Symposium Proceedings 1997, 35th Annual Symposium, pp. 93-104.
P. Bijl et al., "Electro-Optical Imaging System Performance Measurement", Encyclopedia of Optical Engineering 443. TNO-Netherlands Organization for Applied Scientific Research, Soesterberg, The Netherlands, 2003.

* cited by examiner

*Primary Examiner* — Kiho Kim
(74) *Attorney, Agent, or Firm* — AFMCLO/JAZ; Charles Figer (57) ABSTRACT

A quad-emissive display apparatus to provide suitable emissive energy in four spectral bands to provide simultaneous evaluation of sensors having different spectral sensitivities. The apparatus can simultaneously provide four spectral bands of visible (0.4 to 0.7 microns), near infrared (0.7 to 1.0 microns), short wave infrared (1.0 to 3.0 microns) and the long wave infrared (8.0 to 14.0 microns) radiation.

20 Claims, 6 Drawing Sheets

QUAD EMISSIVE DISPLAY

CROSS-REFERENCE TO RELATED APPLICATION

This application claims benefit of U.S. Provisional Patent Application Ser. No. 61/159,172, filed Mar. 11, 2009, titled "Quad Emissive Display", to Pinkus et al., the disclosure of which is expressly incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

The invention relates to an imaging test system for evaluating the imaging quality of one or more sensors and more particularly relates to an emissive display system for evaluating the resolution of multiple sensors.

The resolution of an imaging system can be used as a metric to indicate the quality of its imaging. By knowing the resolution, a level of expected visual performance of the system can be determined. In recent years, there has been widespread interest in the images created by different types of sensors, for instance, sensors representing different electromagnetic spectral bands. In an effort to enhance the visual information content of a scene being imaged, the images created by each sensor are fused together. The underlying assumption is that different spectral bands can provide different kinds of visual information content. By fusing the "best" (most informative) part of each sensor image into a single image, one can improve visual performance. Consequently, visual performance using the fused image may be superior when compared to visual performance using any one of the component images used to create the fused image.

SUMMARY OF THE INVENTION

According to one aspect of the present invention there is provided a display to test the resolving capability of a plurality of sensors each being responsive to a different range of electromagnetic radiation. The display includes a first surface defining an aperture, a target coupled to the aperture, a second surface, spaced from the first surface, at least one heating element coupled to the second surface, to heat the second surface, and a controller coupled to the at least one heating element to control the temperature of the second surface.

Pursuant to another aspect of the present invention there is provided, an imaging system to determine the resolving capability of a plurality of sensors each being responsive to a different range of electromagnet radiation. The system includes a sensor array having at least four sensors wherein each of the sensors is capable of resolving a different range of electromagnetic radiation. A plurality of light sources providing a preselected source of color temperature. A display includes at least a first and a second surface with the second surface spaced from the first surface. At least one of the first and second surfaces includes a heater attached thereto to provide a thermal radiation and the other of the first and second surfaces includes a preselected color temperature. A moving assembly is coupled to one of the sensor array or the display to enable adjustment of a distance between the array and display.

According to still another aspect of the present invention, there is provided a method for testing the resolving capability of at least four imaging sensors simultaneously. The steps include spacing a target having cutouts a predetermined distance from a heated surface, sensing the temperature of the target and the heated surface, controlling a difference in temperature between the sensed temperatures of the target and the heated surface, illuminating the target having cutouts, directing the four imaging sensors at the illuminated display and receiving at the imaging sensors from the target and the heated surface visible spectrum, near infrared spectrum, short wave infrared spectrum, and long wave thermal infrared spectrum electromagnetic radiation.

DETAILED DESCRIPTION

Figure 1:
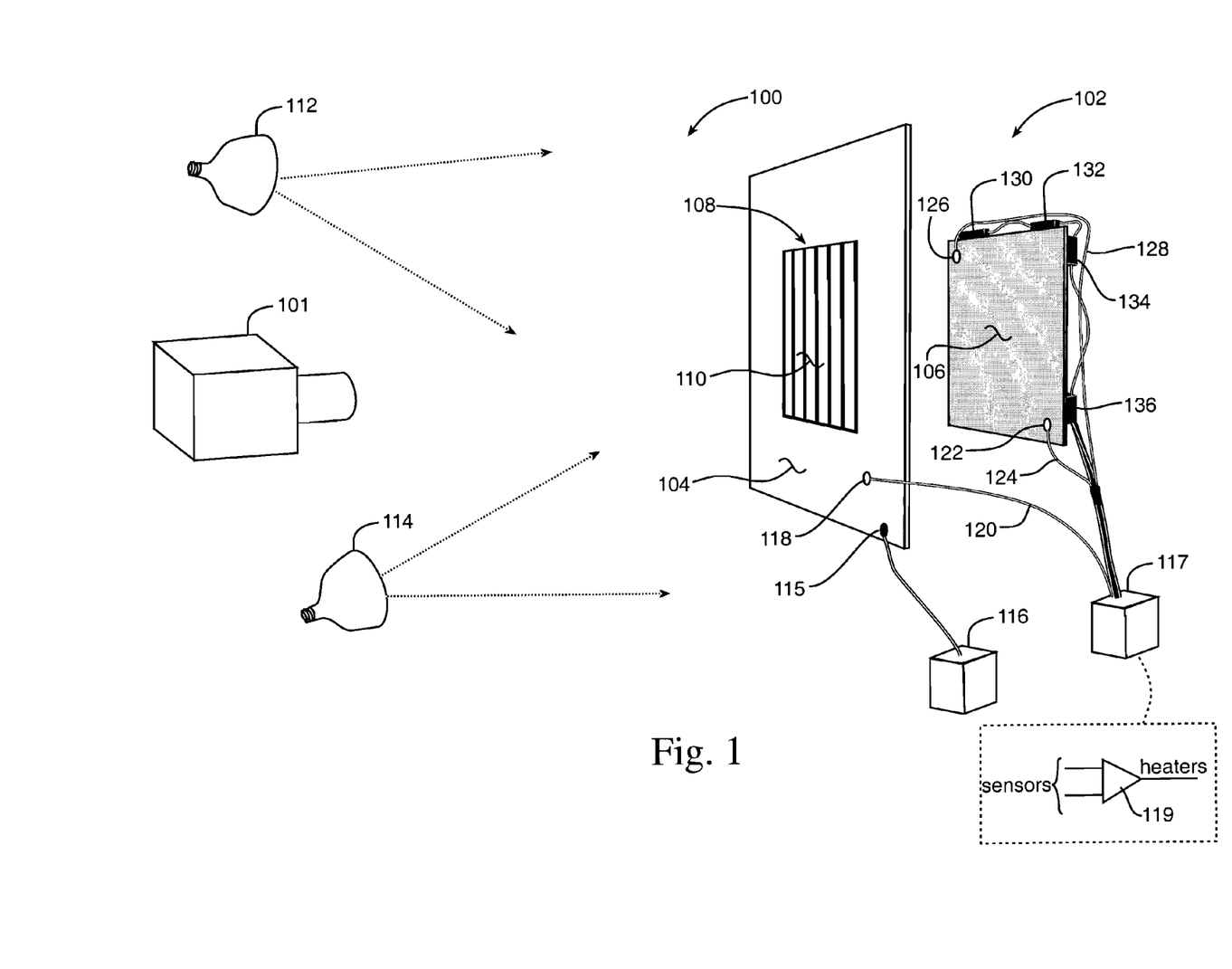
FIG. 1 illustrates a perspective view of components used in an imaging system of the present invention.

FIG. 1 illustrates a perspective view of components used in an imaging system of the present invention. The present invention includes a quad-emissive display for multi-spectral analysis of a variety of sensors used to image a scene. As shown in FIG. 1, an imaging system 100 includes at least one sensor 101, being tested, which is placed a distance away from a display 102. The display 102 can emit multiple bands of spectral energy simultaneously. In particular, the display 102 provides four (quad) different spectral bands simultaneously. The four spectral bands include a visible band (0.4 to 0.7 microns), a near infrared band (NIR) (0.7 to 1.0 microns), a short-wave infrared band (SWIR) (1.0 to 3.0 microns) and a long-wave infrared band (LWIR) (8.0 to 14.0 microns). The display 102 includes a first surface 104 and a second surface 106 to provide a resolution pattern image to be described later herein. The first surface 104 can include an opaque, white plastic surround measuring approximately 61 cm by 61 cm that has an aperture 108 located in the approximate center of the surface 104. As illustrated the cutout 108 has a square configuration measuring 30.5 cm by 30.5 cm. A resolution target 110 positioned at the cutout 108 which is also machined from opaque, white plastic. The target 110 can be placed flush with or behind the first surface 104. In addition, the cutout can be of other dimensions and is not restricted to a square configuration.

The second surface 106 of the display 102 is located a predetermined distance behind the first surface 104. In one embodiment, the distance of the second surface 106 is approximately 37.5 cm behind the first surface. The second surface 106 includes a first aluminum plate coupled to a second aluminum plate with a combined total thickness of about 9.5 mm. The first plate is located at the front and defines the first surface 106. The front plate is painted black. The second plate or rear plate has mounted to a back surface thereof a plurality of heating elements. The rear surface of the back plate is heated to provide a thermal differential between the target 110, which is maintained at ambient room temperature, and the second surface 106 being heated by the heated back plate. While the described embodiment includes two plates for the second surface 106, other numbers of plates, including one, can be used.

Figure 2A:
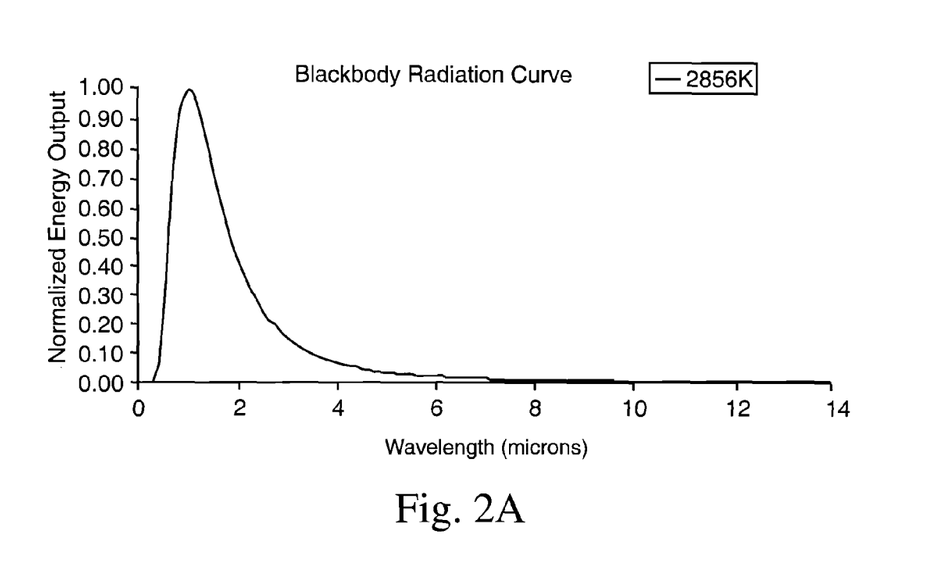
FIGS. 2A and 2B illustrate blackbody radiation curves of the light sources of FIG. 1 and the thermal emission of a heated back plate in FIG. 1.
Figure 2B:
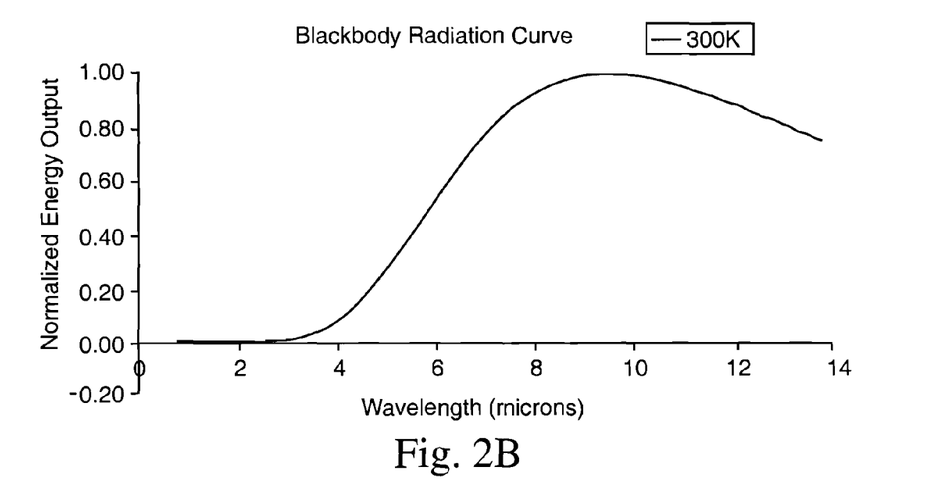

A first light source 112 and a second light source 114 provide illumination directed to the front surface of the target 110. Incandescent illumination provided by the first light source 112 and the second light source 114 provide relatively uniform electromagnetic energy to the front surface of the target 110 for the visible, NIR, and SWIR bands. In one embodiment the first light source 112 and the second light source 114 include 2856K incandescent light sources. The thermal difference between the back plate 106 and the front stencil target 110 provides the emissive electromagnetic radiation difference in the 300K blackbody radiation region, which in the present invention is the ambient temperature of the room, for evaluation of sensors in the long wave infrared LWIR or thermal spectral band. Other ambient temperatures are within the scope of the present invention. Blackbody radiation curves of each source spectral band are shown respectively in FIGS. 2A and 2B.

The light level provided by the light sources 112 and 114 can be monitored by a light sensor 115 mounted to the front surface 104. The sensor 115 can be coupled to an illumination level monitor 116 which provides an indication of the light level provided by the light sources. The light level control can be adjusted to a predetermined light level either manually, for instance, through a rheostat or coupled to a controller as would be understood by one skilled in the art. It is within the scope of the invention to control the light level output of the sources with a feedback system coupled to the illumination level monitor and to the light sources.

Temperature sensors located on the first surface 104 and the second surface 106 provide feedback to a temperature controller 117. The controller 117 is coupled to a first sensor 118 through an electrical line 120, to a second sensor 122 through an electrical line 124 and to a third sensor 126 through an electrical line 128. Sensors having wireless transmitters can also be used to transmit temperature readings.

The controller 117 maintains a relatively constant temperature differential between the surface of the target 110 and the second surface 106. Because the target surface is typically at ambient temperature, the controller 117 can also be coupled to a plurality of heating elements to maintain a predetermined temperature differential. A plurality of heating elements 130, 132, 134, and 136 are coupled to the back plate of the second surface. While four heating elements are shown for purposes of illustration, it is preferred to symmetrically place a number of heating elements about the rear surface of the back plate to provide a uniformly heated second surface 106. Each of the heating elements is coupled to the controller 117 through a plurality of electrical lines as illustrated. Inputs of a comparator 119 are coupled to sensor 118 and 122 to maintain the temperature difference at a preselected temperature as described later. The output of the comparator is used to control the level of heat provided by the heaters as would be understood by one skilled in the art. Other means of control are within the scope of the present intention.

Figure 6:
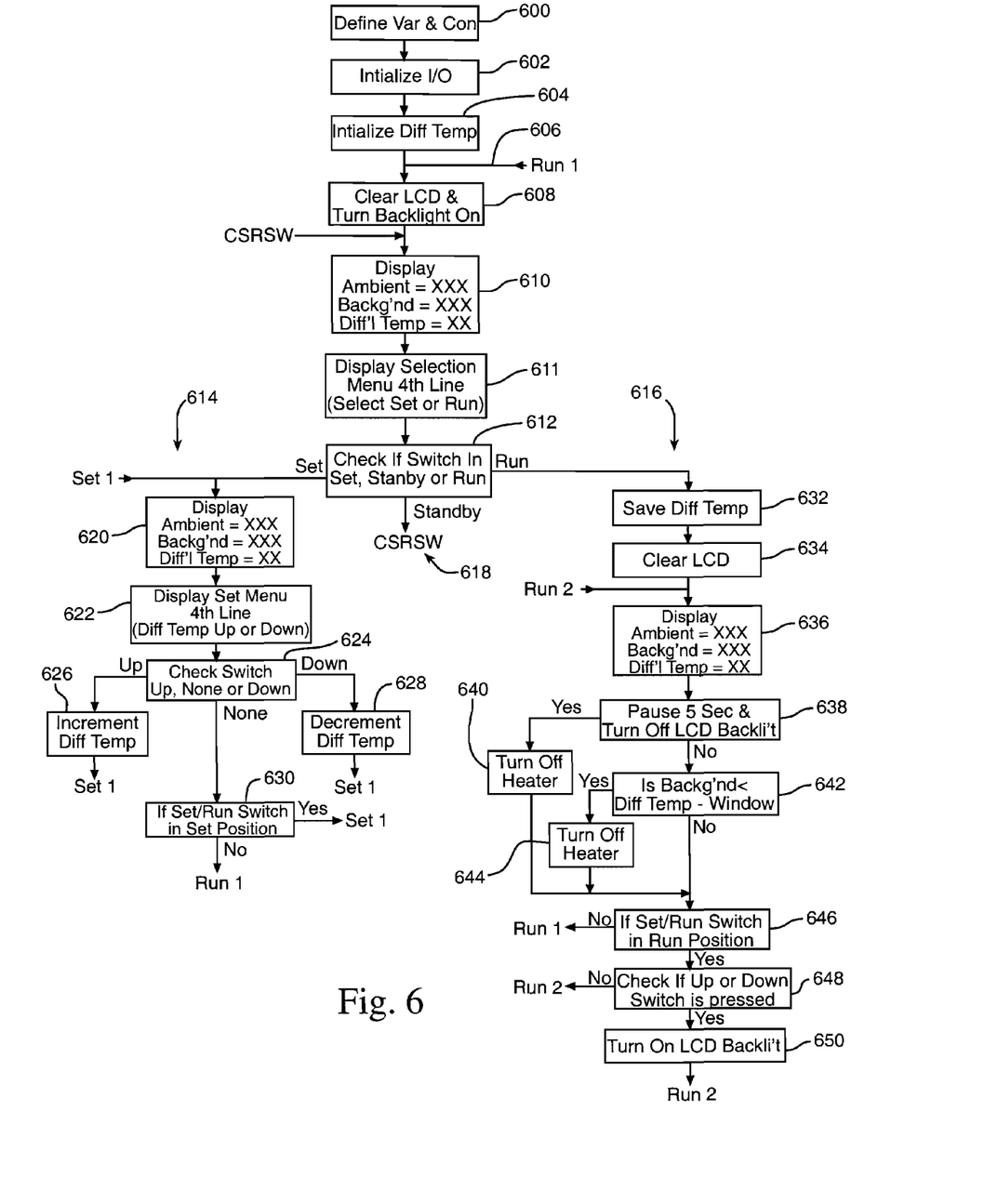
FIG. 6 is a flow diagram illustrating a method for determining the multispectral capabilities of a plurality of sensors of the present invention.

The controller 117 provides a control current to each of the individual heaters to create a controllable surface temperature to the second surface 106. By knowing the ambient temperature of the first surface 104 and controlling the surface temperature of the second surface 106, a temperature differential can be provided. The temperature or thermal differential provides an energy for a thermal or LWIR band sensor, such as the sensor 101. In one embodiment, the maximum temperature differential is about 11K (11 degrees C.). Three temperatures can be displayed on a user interface (not shown) coupled to the controller 117 including: (1) the front surface of the target or ambient temperature, (2) the second surface or background temperature, and (3) the differential temperature setting. The user interface can include an LED display located at the controller 117 or can be a screen coupled to a computer used to monitor and to control the temperature differential. The controller can include a microcontroller, a display, an ND converter to convert analog sensed temperatures to digital temperatures for microcontroller operations, and associated control circuitry. A mode switch includes three positions. A SET position allows the user to select/change the differential temperature. A center position is used as a standby position. A RUN position activates and maintains the temperature of the rear surface. Two LEDs can be used to indicate power and thermal heater on conditions. A flow diagram, discussed later in FIG. 6, is embodied in software resident on memory associated with the microcontroller. Closed loop control can used to maintain the temperature differential between the ambient temperature of the front surface 104 and the back surface 106.

Figure 3:
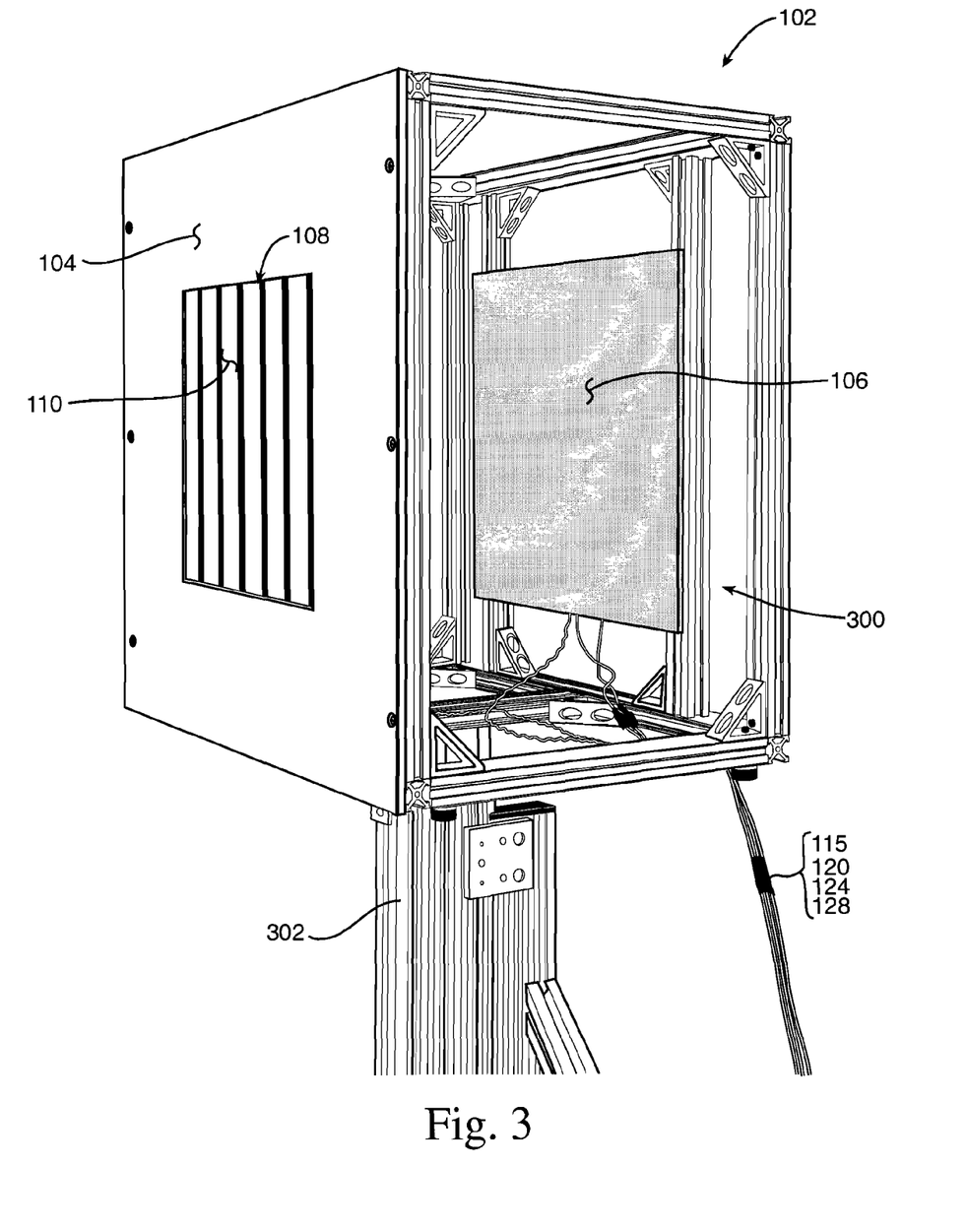
FIG. 3 illustrates a perspective view of a display of the present invention having a first target.

FIG. 3 illustrates a perspective view of the display 102 including the first surface 104 supporting the target 110 both of which are spaced from the second surface 106. A support frame 300 can include a plurality of structural components disposed to form a hexahedron where the first surface 104 is attached a front portion of the frame and the second surface is attached to a rear portion of the frame. The frame 300 is supported by a stand 302 to provide elevation of the target 108 to a predetermined height and transportability. As illustrated, six sides are open to enable precise control of the temperature differential between the first surface 104 and the second surface 106. Cables 115, 120, 124 and 128 can be bound together for routing to the frame and to keep such cables from interfering with the energy transmission between the second surface 106 to the target 110. Other frames types are within the scope of the invention including closed structures as long as the temperature differential can be controlled to a steady state.

Figure 4:
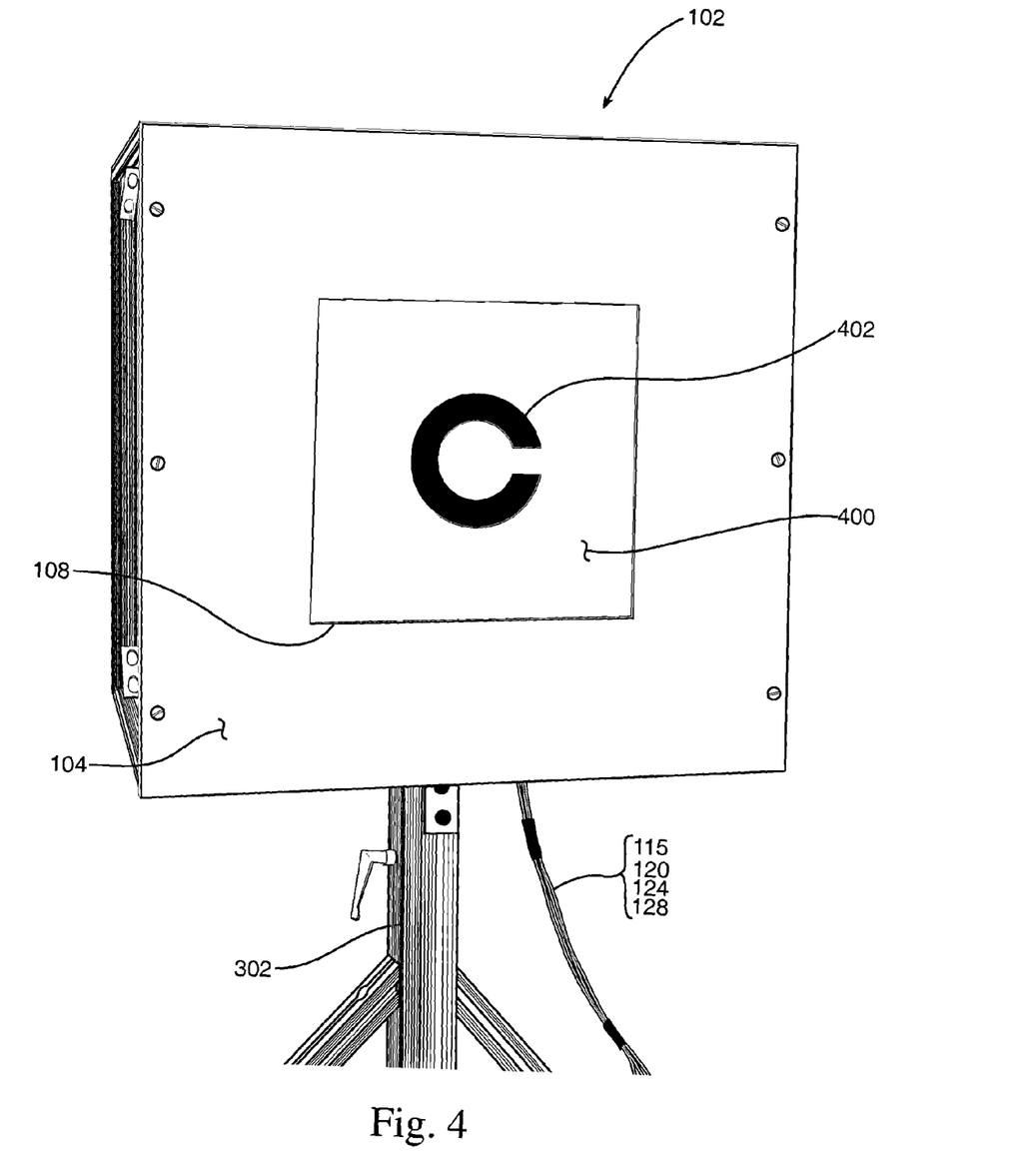
FIG. 4 illustrates a different perspective view of a display of the present invention having second target.

FIG. 4 illustrates an alternative perspective view of the display 102 including a different type of target 400. The aperture 108 can accept any number of different types of targets depending on the type of sensor attributes being investigated. A target pattern is cut from a sheet of white reflecting (visible, near IR, and short wave IR) material such that the sensor can image a high signal level for the stencil material and low level signal for the holes in the stencil as the black (non-reflecting in the first three bands) thermal surface. The thermal sensor (8-14 microns) will see a low (cold) signal stencil surround with a high (hot) signal visible through the holes in the stencil. In this fashion, a resolution pattern for all four bands can be provided simultaneously for multi-band sensor testing and sensor fusion assessment.

As seen in FIG. 1, the target 110 is known as a grating target. Grating targets can include a predetermined number of vertically oriented horizontally spaced bars. The bars have been cut from the stencil material and appear black due to the surface 106. FIG. 4, however, illustrates a Landolt C target 400. The Landolt C target includes a predetermined letter C made by creating a cutout of the letter C in the target material. In the same way, other stencil targets can be fabricated and supported within the aperture 108. A Landolt C, a grating pattern (six cycles), and several triangle targets have been fabricated in stencil form. Landolt C patterns and tri-bar targets have been used to assess image intensifier tubes in night vision goggles (NVGs) and can be used in the present invention. It has been found, however, while such target patterns for NVG assessment may be reasonably well suited to make resolution measurements of continuous (or quasi-continuous) imaging systems, variable results may be produced with sensors that essentially "sample" the target pattern with a two-dimensional rectilinear array of sensing elements.

Figure 5:
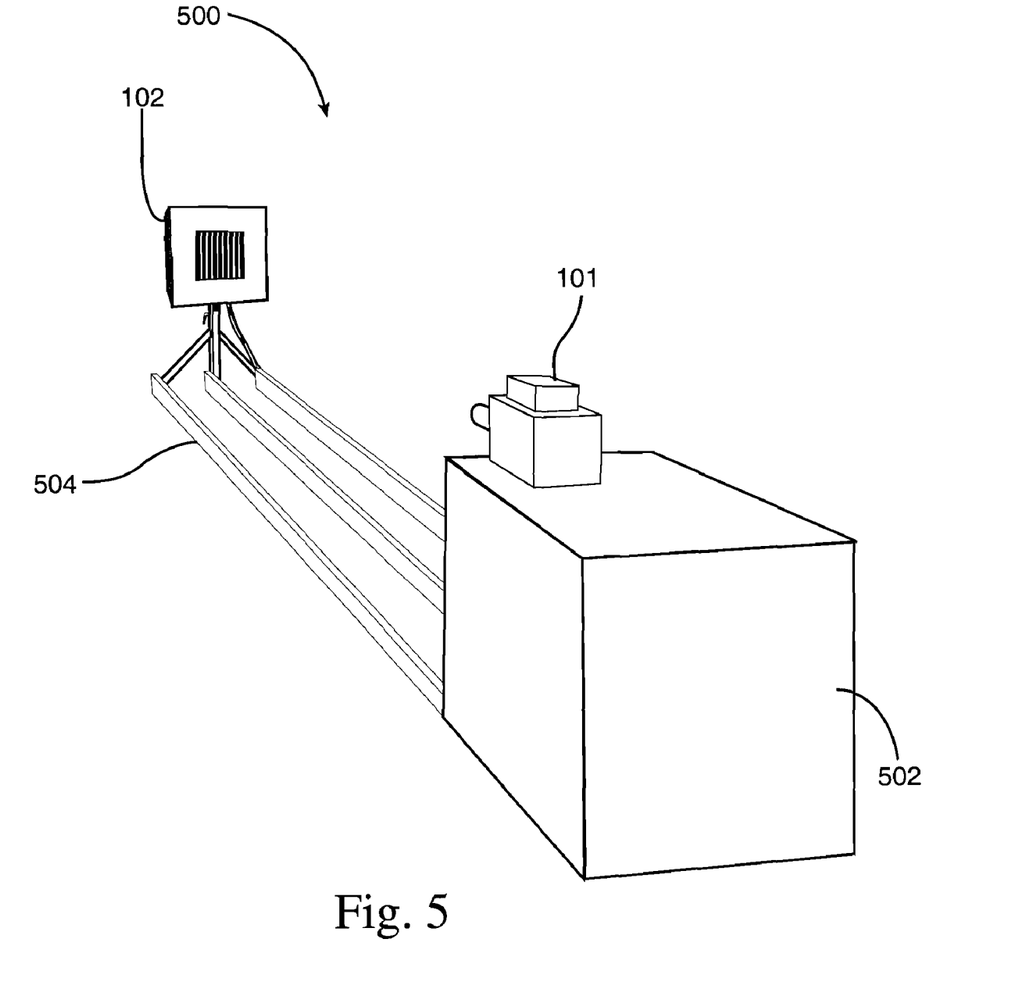
FIG. 5 illustrates a sensor array and a display being used in a sensor evaluation facility.

FIG. 5 illustrates the sensor array 101 and the display 102 being used in a sensor evaluation room 500. The imaging system 100 is located in a long, light-controlled room to allow sensors to be tested at various distances ranging from about 2.7 meters to 46.9 meters or more depending on the types of sensors. A movable cart 502 moves on tracks 504 and can be positioned anywhere along the track 504 to provide testing at the range of predetermined distances for evaluating different sensors (or different resolution target patterns). The cart 502 supports the sensor array 101 which includes four sensors, each one being selected to capture one of the four spectral bands of 0.4 to 0.7 microns, 0.7 to 1.0 microns, a 1.0 to 3.0 microns, and 8.0 to 14.0 microns. The four sensors include visible, NIR, SWIR, and thermal cameras generally pointed in the same direction toward the target pattern (or a terrain board depending on requirements). The quad spectral band nature of the present invention allows for the simultaneous assessment of all four cameras imaging the four spectral bands. The cart can also be used to support an observer whose position can be adjusted with respect to the target.

In addition to the adjustable longitudinal movement between the sensor and the target pattern along the track, precise lateral movement (left-right) of the target within the aperture 108 can be made using a manually controlled screw mechanism. In one embodiment, up to 10 cm of lateral movement is possible to investigate sensor detector array sampling effects with respect to the horizontal features of the target pattern. A similar range of precise vertical movement can also made using a similar mechanism.

FIG. 6 is a flow diagram illustrating a method for determining the multispectral capabilities of a plurality of sensors each capable of sensing different spectral bands of electromagnetic energy. The flow diagram begins at step 600 in which the variable and constant values are defined. These variable and constant values are the initialization values. At step 602, the inputs and outputs ports are defined to enable the setting of any variables and constants which have been defined at step 600. The temperature differential between the first surface 104 and the second surface 106 is initialized at step 604. The first surface or ambient temperature is read, and stored. The second surface temperatures are set to the initialized value in the computer software, which provides an accurate reading of the actual temperature differential maintained during testing of the sensors 101.

After the differential temperatures have been initialized at step 604, the computer program includes an entry point 606 for the Run 1 initialization started at a later point in the flow diagram. If the Run 1 initialization has not been set, the data flow continues and the LCD display is cleared and the backlight for the display is turned on at step 608. Once step 608 has been completed, the program can enter at point 610 to "check set run switch" (CSRSW) from point 618 to be described. At step 610 the display on the controller 117 or user interface displays the actual ambient temperature located at the first surface 104, the background temperature at the second surface 106, and the differential temperature between each. After the display of sensed temperatures and the differential temperature at step 610, the selection menu $4^{th}$ line is displayed at step 611. The selection menu indicates the position of the switch used to select the modes of operation including set, standby, or run. After display of these settable inputs, step 612 determines the position of the switch to one of the options, set, standby or run. If in the set position, the software proceeds to the set routine 614. If in the run position, the software proceeds to the run routine 616, and if in the standby position, the software proceeds to the CSRSW routine 618.

The set routine 614 includes display at a display menu of step 620 as described for step 610. After display of the temperatures at step 620, the display provides the option of adjusting the differential temperature up or down at step 622. Adjusting the differential temperature up can provide a greater differential temperature and adjusting the differential temperature down can provide a smaller differential temperature. The differential temperature is changed based on a difference between the ambient temperature, which remains relatively constant, and the second surface temperature which can be changed with adjustment of the heaters as previously described.

At step 624, the position of the switch is checked by the software. If the switch is up as determined, then at step 626, the differential temperature is incremented. If the switch is down as determined, then at step 628, the differential temperature is decremented. If the switch is in the neutral position, then there is no change and the position of the set/run switch is checked at step 630. If in the set position, then the software proceeds to the Set 1 location. If the set/run switch is not in the set position, then the software proceeds to the Run 1 location.

If the switch is determined to be in the run position as step 612, the run routine 616 is selected which initially saves the selected differential temperature at step 632. The LCD is cleared at step 634. An entry point into the software for run 2 is provided after this step. Step 636 provides for the display of the same temperatures as those of blocks 610 and 616. After display, the routine pauses for a preselected period of time, in this case 5 seconds, and then turns off the LCD backlight at step 638. Turning off the backlight, provides for a more accurate test of the sensors 101. The temperature differential is continuously monitored at this point and if the temperature difference between the second surface 106 and the first surface 104 is as selected, the heaters are turned off at step 640. If the determination is Yes at step 642, then the heater is turned off at step 644. If No, turn heater on, then the set/run switch is checked at step 646. If not in the run position, the routine selects the address of the Run 1 location. If yes, then the position of the temperature switch is determined at step 648. If the position is not up or down, then the routine selects the address of the Run 2 location. If the position is either up or down, then the routine proceeds to turn on the LCD backlight at step 650. After turning on the backlight, the routine proceeds to the address of the Run 2 location.

There are at least two ways that the present invention can be used to assess the resolution of a sensor: 1) produce a series of images of the target pattern at different distances using the moveable cart and present the images of the target pattern to trained observers or to custom software to obtain a frequency-of-seeing curve; or 2) have an observer seated in the cart while the cart is dynamically moved toward the target pattern until the observer can accurately determine the critical aspect of the resolution target (usually orientation of the target or visibility of the structure of the grating if a grating is used).

The first method takes time to collect sufficient images at several distances (e.g., five to seven distances) so that they can be presented to the observers at a later time to produce a frequency-of-seeing curve. The frequency of seeing curve plots fraction correct on the vertical axis and distance or angular subtense (size) of a target on the horizontal axis. The curve typically ranges from 1 (100% correct identification on the critical target detail, such as the gap in the Langolt C) to 0 or chance level (depending on target pattern) at very long distances (or small target sizes). The total curve is the frequency of seeing curve—a best fit sigmoid curve through the data points This procedure requires the observers to spend a minimal amount of time actually observing the target patterns on a display. Care, however, must be taken to insure the display image quality and the observer viewing conditions are not the limiting factors in judging sensor performance. Since observers and displays are always a part of the sensor assessment procedure, they will always impact the results to some degree. The objective is to minimize that impact when assessing the sensors. One disadvantage of this approach is that it does not include dynamic effects so that any sampling artifacts that are captured in the original images are not "averaged out" by the dynamic sampling that occurs with the moving cart approach (sampling issues are briefly discussed in a later section).

The second method has the advantage of relative motion and dynamic sampling but requires considerably more time to complete. In addition, one does not obtain a frequency-of-seeing curve but a simple end point resolution measurement with whatever error rate occurs. Error rates can be affected by instructions to the observers regarding "guessing" with respect to the orientation of the target pattern.

The question arises as to whether or not a measurement of the "resolution" of the fused image would correlate with the level of visual performance obtained using the fused image. In order to address this question, it is necessary to measure the resolution of each of the component imaging systems (e.g., visible, near-infrared (NIR), short-wave infrared (SWIR), long-wave infrared (LWIR)) and to measure the effective resolution of the fused image created from the component imaging bands. In order to reduce variance as much as possible, it is desirable to have a resolution target that can provide a "high contrast" image in all spectral bands simultaneously.

While this invention has been described with specific embodiments thereof, alternatives, modifications and variations may be apparent to those skilled in the art. For instance, the present invention can be used with many different types of targets either known or made for a specific application. Accordingly, it is intended to embrace all such alternatives, modifications and variations that fall within the spirit and broad scope of the appended claims.

What is claimed is:

1. A display to test the resolving capability of a plurality of sensors each being responsive to a different range of electromagnetic radiation, the system comprising:
   a first surface defining an aperture;
   a target coupled to the aperture;
   a second surface, spaced from the first surface;
   at least one heating element coupled to the second surface, to heat the second surface; and
   a controller coupled to the at least one heating element to control the temperature of the second surface.

2. The display of claim 1, further comprising a first temperature sensor coupled to the first surface, to sense the temperature thereof, and a second temperature sensor coupled to the second surface, to sense the temperature thereof, each of the temperature sensors coupled to the controller.

3. The display of claim 2, wherein the controller includes a comparator, to generate a signal indicative of a difference between the temperatures provided by the first and the second temperature sensors.

4. The display of claim 3, wherein the first surface comprises a surface having a color temperature of about 1000K or more.

5. The display of claim 4, wherein the second surface comprises a surface having a color temperature of about plus or minus 300K.

6. The display of claim 3, wherein the first surface comprises a surface capable of reflecting visible, near infrared, and short wave infrared radiation.

7. The display of claim 3, wherein a portion of the target includes a predetermined cutout through which an electromagnetic radiation can pass, the electromagnetic radiation being provided by the heated second surface.

8. The display of claim 7, wherein the predetermined cutout includes at least one of a Landolt C, tumbling E, tumbling U, square wave grating, tri-bar target, and multiple gratings.

9. An imaging system to determine the resolving capability of a plurality of sensors each being responsive to a different range of electromagnet radiation, the system comprising:
   a sensor array having at least four sensors, each of the sensors capable of resolving a different range of electromagnetic radiation;
   a plurality of light sources, each of the plurality of light sources providing a preselected source of color temperature;
   a display having at least a first and a second surface, the second surface being spaced from the first surface, at least one of the first and second surfaces having a heater attached thereto to provide a thermal radiation and the other of the first and second surfaces having a preselected color temperature; and
   a moving assembly coupled to one of the sensor array or the display to enable adjustment of a distance between the array and display.

10. The imaging system of claim 9, wherein the plurality of light sources includes a first light source and a second light source each having a color temperature of about 1000K or more.

11. The imaging system of claim 10, wherein the surface other than the one being heated includes a surface having a color temperature of about 1000K or more.

12. The imaging system of claim 11, wherein one of the first and second surfaces includes an aperture and a target, the target mounted to the first surface to close off at least part of the aperture, the target including at least one cutout.

13. The imaging system of claim 12, wherein the at least one cutout includes at least one of a Landolt C, tumbling E, tumbling U, square wave grating, tri-bar target, and multiple gratings.

14. The imaging system of claim 13, wherein the four sensors of the sensor array sense one of the four spectral bands of about 0.4 to 0.7 microns, about 0.7 to 1.0 microns, about 1.0 to 3.0 microns, and about 8.0 to 14.0 microns.

15. A method for testing the resolving capability of at least four imaging sensors comprising the steps of:
   spacing a target having cutouts a predetermined distance from a heated surface;
   sensing the temperature of the target and the heated surface;
   controlling a difference in temperature between the sensed temperatures of the target and the heated surface;
   illuminating the target having cutouts;
   directing the four imaging sensors at the illuminated display simultaneously; and
   receiving at the imaging sensors from the target and the heated surface visible spectrum, near infrared spectrum, short wave spectrum, and long wave thermal infrared spectrum electromagnetic radiation.

16. The method of claim 15, wherein the receiving step includes receiving the visible spectrum, the near infrared spectrum, the short wave spectrum, and the long wave thermal infrared spectrum radiation simultaneously at the four imaging sensors.

17. The method of claim 15, wherein the sensing step comprises sensing the temperature of the target with a temperature sensor.

18. The method of claim 17, wherein the sensing step comprises sensing the temperature of the heated surface with a temperature sensor.

19. The method of claim 15, further comprising controlling the difference in temperature between the sensed temperatures of the target and the heated surface to a predetermined difference.

20. The method of claim 19, further comprising controlling the temperature of the heated surface to maintain the predetermined temperature difference between the target and the heated surface.

* * * * *